United States Patent
Sankaran et al.

(10) Patent No.: US 10,425,793 B2
(45) Date of Patent: *Sep. 24, 2019

(54) STAGGERED BACK-TO-BACK LAUNCH TOPOLOGY WITH DIAGONAL WAVEGUIDES FOR FIELD CONFINED NEAR FIELD COMMUNICATION SYSTEM

(71) Applicant: Texas Instruments Incorporated, Dallas, TX (US)

(72) Inventors: Swaminathan Sankaran, Allen, TX (US); Benjamin Stassen Cook, Addison, TX (US); Nathan Brooks, Champaign, IL (US); Bradley Allen Kramer, Plano, TX (US); Mark W. Morgan, Allen, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,194

(22) Filed: Jun. 29, 2017

(65) Prior Publication Data
US 2019/0007786 A1 Jan. 3, 2019

(51) Int. Cl.
*H04B 5/00* (2006.01)
*H04W 4/80* (2018.01)
(Continued)

(52) U.S. Cl.
CPC .............. *H04W 4/80* (2018.02); *G06F 13/14* (2013.01); *H04B 5/0031* (2013.01);
(Continued)

(58) Field of Classification Search
CPC ... H04W 4/008; H04B 5/0031; H04B 5/0075; H04L 29/06068; H04L 67/12; G06F 13/14
(Continued)

(56) References Cited

U.S. PATENT DOCUMENTS

| 5,274,800 A | 12/1993 | Babb et al. |
| 6,724,880 B1 | 4/2004 | Lynch |

(Continued)

FOREIGN PATENT DOCUMENTS

| EP | 2338238 B1 | 3/2016 |
| RU | 2192716 C2 | 11/2002 |

(Continued)

OTHER PUBLICATIONS

U.S. Appl. No. 15/638,163, filed Jun. 29, 2017.*
(Continued)

*Primary Examiner* — Nhan T Le
(74) *Attorney, Agent, or Firm* — Michelle F. Murray; Charles A. Brill; Frank D. Cimino

(57) ABSTRACT

A system is provided in which a set of modules each have a substrate on which is mounted a radio frequency (RF) transmitter and/or an RF receiver coupled to a near field communication (NFC) coupler located on the substrate. Each module has a housing that surrounds and encloses the substrate. The housing has a port region on a surface of the housing. Each module has a field confiner located between the NFC coupler and the port region on the housing configured to guide electromagnetic energy emanated from the NFC coupler through the port region to a port region of an adjacent module. The port region is offset laterally from the NFC coupler. The field confiner is skewed to provide a pathway between the NFC coupler and the port region.

20 Claims, 12 Drawing Sheets

(51) Int. Cl.
*H04L 29/06* (2006.01)
*G06F 13/14* (2006.01)
*H04L 29/08* (2006.01)

(52) U.S. Cl.
CPC ..... *H04B 5/0075* (2013.01); *H04L 29/06068* (2013.01); *H04L 67/12* (2013.01)

(58) Field of Classification Search
USPC ....................................................... 455/41.1
See application file for complete search history.

(56) References Cited

U.S. PATENT DOCUMENTS

| | | | |
|---|---|---|---|
| 9,306,263 | B2 | 4/2016 | Herbsommer et al. |
| 9,590,699 | B1 | 3/2017 | Garud et al. |
| 2001/0031046 | A1 | 10/2001 | Troibner et al. |
| 2002/0118524 | A1 | 8/2002 | Berg, Jr. et al. |
| 2005/0157652 | A1 | 7/2005 | Tang et al. |
| 2008/0153416 | A1 | 6/2008 | Washiro |
| 2009/0157937 | A1 | 6/2009 | Kuschke et al. |
| 2009/0291634 | A1 | 11/2009 | Saarisalo |
| 2010/0315389 | A1 | 12/2010 | Sorrell et al. |
| 2011/0217927 | A1 | 9/2011 | Ben-Shalom et al. |
| 2012/0026646 | A1 | 2/2012 | Thielmann et al. |
| 2012/0026647 | A1 | 2/2012 | Thielmann et al. |
| 2012/0031964 | A1 | 2/2012 | Thielmann et al. |
| 2012/0031965 | A1 | 2/2012 | Thielmann et al. |
| 2012/0098664 | A1 | 4/2012 | Nordin et al. |
| 2012/0185579 | A1 | 7/2012 | Watanabe |
| 2013/0135084 | A1 | 5/2013 | Chakravarty et al. |
| 2013/0234883 | A1 | 9/2013 | Ma et al. |
| 2014/0091138 | A1 | 4/2014 | Nordin et al. |
| 2014/0233460 | A1 | 8/2014 | Pettus et al. |
| 2014/0265611 | A1 | 9/2014 | Fern et al. |
| 2014/0276426 | A1 | 9/2014 | Borges et al. |
| 2014/0285281 | A1* | 9/2014 | Herbsommer ............ H01P 3/16 333/26 |
| 2015/0086017 | A1 | 3/2015 | Taylor et al. |
| 2015/0089221 | A1 | 3/2015 | Taylor et al. |
| 2015/0199192 | A1 | 7/2015 | Borges |
| 2015/0199485 | A1 | 7/2015 | Borges |
| 2015/0236512 | A1 | 8/2015 | Whitney |
| 2015/0244427 | A1 | 8/2015 | Kim et al. |
| 2015/0253028 | A1 | 9/2015 | Masuyama et al. |
| 2015/0253794 | A1 | 9/2015 | Palmer et al. |
| 2015/0253821 | A1 | 9/2015 | Palmer et al. |
| 2015/0253829 | A1 | 9/2015 | Palmer et al. |
| 2015/0256386 | A1 | 9/2015 | Palmer et al. |
| 2015/0256394 | A1 | 9/2015 | Palmer et al. |
| 2015/0256396 | A1 | 9/2015 | Palmer et al. |
| 2015/0256406 | A1 | 9/2015 | Palmer et al. |
| 2015/0256409 | A1 | 9/2015 | Masuyama et al. |
| 2015/0257302 | A1 | 9/2015 | Masuyama et al. |
| 2015/0257311 | A1 | 9/2015 | Palmer et al. |
| 2015/0277503 | A1 | 10/2015 | Eremenko et al. |
| 2015/0288422 | A1 | 10/2015 | Fishman et al. |
| 2015/0300923 | A1 | 10/2015 | Halbert |
| 2015/0326437 | A1 | 11/2015 | Shrestha et al. |
| 2016/0182130 | A1 | 6/2016 | Ahmed et al. |
| 2016/0261219 | A1 | 9/2016 | Uusi-Aijo |
| 2017/0054835 | A1 | 2/2017 | Gadi et al. |
| 2017/0134071 | A1 | 5/2017 | Sankaran et al. |
| 2017/0324446 | A1 | 11/2017 | Cook et al. |
| 2018/0081137 | A1 | 3/2018 | Rivaud et al. |
| 2019/0028146 | A1 | 1/2019 | Morgan et al. |

FOREIGN PATENT DOCUMENTS

| | | |
|---|---|---|
| WO | 2010029987 A1 | 3/2010 |
| WO | 2015040826 A1 | 3/2015 |
| WO | 2007122439 A1 | 11/2017 |

OTHER PUBLICATIONS

U.S. Appl. No. 15/638,212, filed Jun. 29, 2017.*
"Metamaterial", Wikipedia, pp. 1-15, available at https://en.wikipedia.org/wiki/Metamaterial on Dec. 4, 2015.
"Programmable Logic Controller", Wikipedia, pp. 1-10, available at https://en.wikipedia.org/wiki/Programmable_logic_controller on Dec. 2, 2015.
Hongqiang Li et al, "Multi-brand Artificial Magnetic Surface and Its Applications in Antenna Substrate", 2004 4th International Conference on Microwave and Millimeter Wave Technology Proceedings, Aug. 18-21, 2004, Beijing, China, pp. 483-486.
J. R. Sohn et al, "Comparative Study on Various Artificial Magnetic Conductors for Low-Profile Antenna", Progress in Electromagnetics Research, PIER 61, 2006, pp. 27-37.
Benjamin Stassen Cook et al, "Tapered Coax Launch Structure for a Near Field Communication System", U.S. Appl. No. 15/368,146, filed Jun. 29, 2017, pp. 1-29.
Nathan Brooks et al, "Integrated Artificial Magnetic Launch Surface for Near Field Communication System", U.S. Appl. No. 15/638,163, filed Jun. 29, 2017, pp. 1-44.
Benjamin Stassen Cook et al, "Launch Topology for Field Confined Near Field Communication System", U.S. Appl. No. 5/638,212, filed Jun. 29, 2017, pp. 1-43.
Benjamin Stassen Cook et al. "Launch Topology for Field Confined Near Field Communication System," U.S. Appl. No. 15/638,212, filed Jun. 29, 2017, pp. 1-43.
"Split-ring Resonator", Wikipedia, pp. 1-9, available at https://en.wikipedia.org/wiki/Split-ring_resonator on Jun. 13, 2018.
Tunable Metamaterial; www.Wikipedia.org, printed Mar. 9, 2018; 11 pages.
PCT Search Report for PCT/US18/042611 dated Oct. 18, 2018.
PCT Search Report for PCT/US18/040436 dated Oct. 18, 2018.

* cited by examiner

STAGGERED BACK-TO-BACK LAUNCH TOPOLOGY WITH DIAGONAL WAVEGUIDES FOR FIELD CONFINED NEAR FIELD COMMUNICATION SYSTEM

CROSS REFERENCE TO RELATED APPLICATIONS

This patent application is related to U.S. patent application Ser. No. 15/658,163 filed Jun. 29, 2017; U.S. patent application Ser. No. 15/638,212 filed Jun. 29, 2017; and U.S. patent application Ser. No. 15/638,146 filed Jun. 29, 2017. These three applications are incorporated by reference herein.

FIELD OF THE DISCLOSURE

This disclosure generally relates to the use of near field communication (NFC) in place of physical/ohmic contacts for communication among system modules.

BACKGROUND OF THE DISCLOSURE

Near Field Communication (NFC) is a wireless technology allowing two devices to communicate over a short distance of approximately 10 cm or less. Various protocols using NFC have been standardized internationally within NFC Forum specifications and defined in ISO/IEC 18092, ECMA-340, and ISO 14443, for example. NFC allows a mobile device to interact with a subscriber's immediate environment. With close-range contactless technology, mobile devices may be used as credit cards, to access public transportation, to access secured locations, and many more applications. Contactless systems are commonly used as access control ID's (e.g. employee badges), as well as payment systems for public transportation etc. More recently, credit cards are beginning to include NFC capability.

Typical NFC systems rely on low-frequency signals with structures such as coils or capacitive plates with large fringing electric or magnetic fields to facilitate signal transfer over a short distance. However, these low frequencies limit data rate. To increase data rate, the frequency of the carrier must be increased, and a large bandwidth around that carrier must be allocated.

Permittivity is a material property that expresses a measure of the energy storage per unit meter of a material due to electric polarization $(J/V^2)/(m)$. Relative permittivity is the factor by which the electric field between the charges is decreased or increased relative to vacuum. Permittivity is typically represented by the Greek letter $\varepsilon$. Relative permittivity is also commonly known as dielectric constant.

Permeability is the measure of the ability of a material to support the formation of a magnetic field within itself in response to an applied magnetic field. Magnetic permeability is typically represented by the Greek letter $\mu$.

A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability, which is expressed by a number called the relative permittivity ($\varepsilon r$). The term insulator is generally used to indicate electrical obstruction while the term dielectric is used to indicate the energy storing capacity of the material by means of polarization.

BRIEF DESCRIPTION OF THE DRAWINGS

Particular embodiments in accordance with the disclosure will now be described, by way of example only, and with reference to the accompanying drawings.

Figure 1:
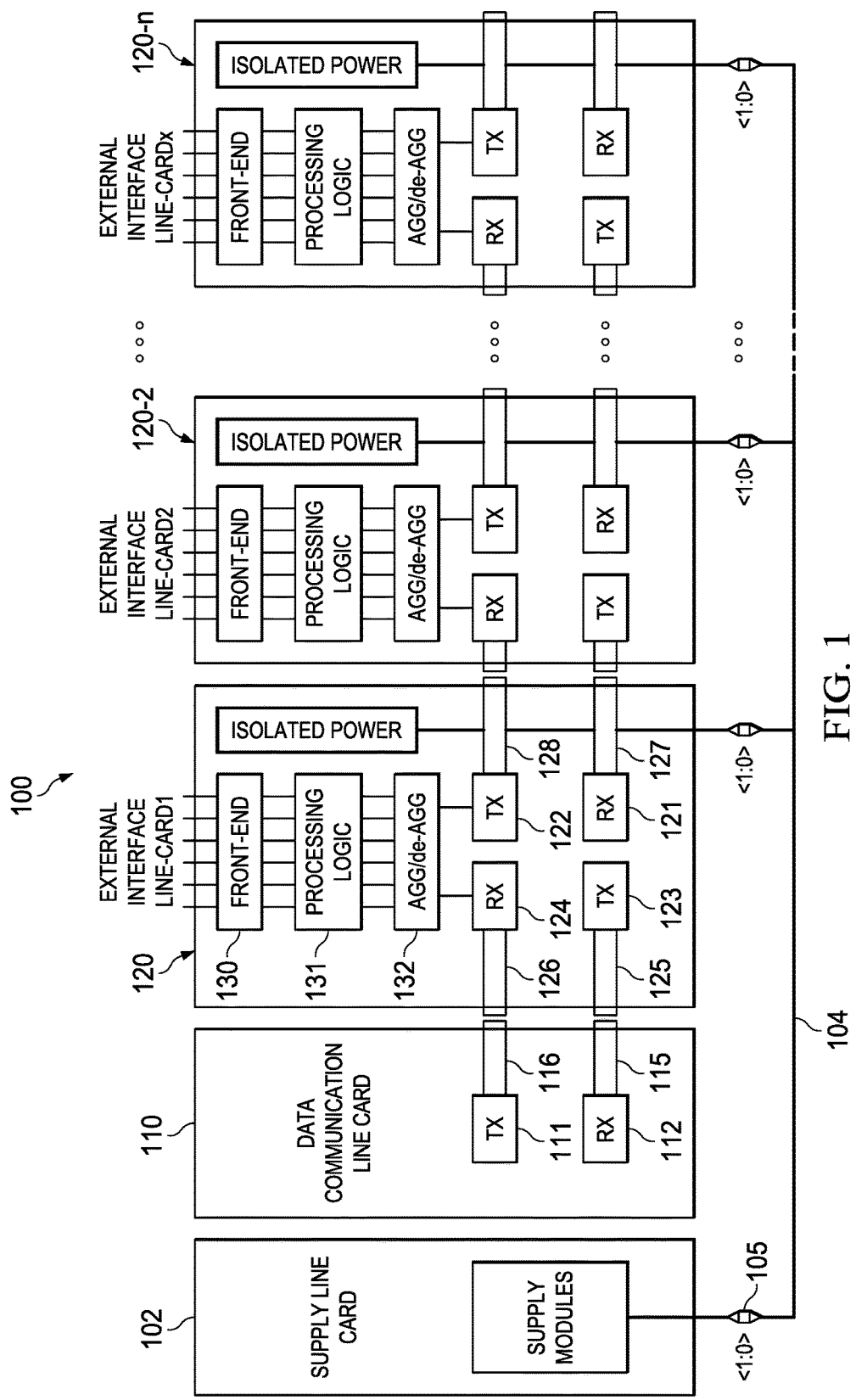
FIG. 1 is a block diagram of an exemplary system that uses guided NFC communication between modules.

Other features of the present embodiments will be apparent from the accompanying drawings and from the detailed description that follows.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

As mentioned above, Near Field Communication (NFC) is a short-range wireless connectivity technology that uses magnetic field induction to enable communication between devices when they are touched together, or brought within a few centimeters of each other. Several communication protocols using NFC have now been standardized, such as ISO/IEC 18092, ECMA-340, and ISO 14443, for example. The various standards specify a way for the devices to establish a peer-to-peer (P2P) network to exchange data.

Contactless systems are commonly used as access control ID's (e.g. employee badges), as well as payment systems for public transportation etc. More recently, credit cards are beginning to include NFC capability. However, waves in open space propagate in all directions, as spherical waves. In this way, the far field loses power proportionally to the square of the distance; that is, at a distance R from the source, the power is the source power divided by R squared. Such random wave propagation may also result in interference to other systems that are located nearby and be in violation of emission limits set by standard bodies such as FCC.

Typical near field communication systems (NFC) rely on low-frequency signals with structures like coils or capacitive plates with large fringing electric or magnetic fields to perform signal transfer over a short distance (several mm). However, these low frequencies limit data rate. To increase data rate, the frequency of the carrier must be increased, and a large bandwidth around that carrier must be allocated. Typical NFC techniques do not work well at high frequencies because inductive and capacitive communication works best when the distance and coil/capacitor size is much shorter than the wavelength. For example, 13.56 MHz has a wavelength of 22 meters, while 13.56 GHz has a wavelength of only 22 millimeters.

Embodiments of the present disclosure may increase the frequency and bandwidth of NFC systems by using a dielectric or metallic/dielectric field confinement block to confine the electromagnetic fields between the transmitter (Tx) and receiver (Rx), and by using modal launching structures that launch suitable modes (TE10, TE11 for example) to transmit and receive the fields over a large bandwidth. An artificial magnetic conductor (AMC) surface may be positioned behind the modal launching structure to redirect a backside field to the desired direction of propagation.

A dielectric field confiner may be used to confine the wave to propagation in one dimension, so that under ideal conditions the wave loses no power while propagating. A NFC field confiner (FC) may be used as a medium to communicate between modules in a system, for example. The FC may be a simple block of dielectric selected to have a high permittivity or a high permeability in order for it to confine NFC energy by reducing the wavelength of the radiated energy. The dielectric may also be coated with a conductive or non-conductive material for better confinement.

A NFC field confiner may also be constructed from a metamaterial. Metamaterials are smart materials engineered to have properties that have not yet been found in nature. They are made from assemblies of multiple elements fashioned from composite materials such as metals or plastics. The materials are usually arranged in repeating patterns, at scales that are smaller than the wavelengths of the phenomena they influence. Metamaterials derive their properties not from the properties of the base materials, but from their newly designed structures. Metamaterials may be designed to have a negative relative permittivity and/or a negative relative permeability. Such matamaterials may be referred to as "negative index materials." Metamaterials are now well known and need not be described further herein; see, e.g. "Metamaterials," Wikipedia, as of Dec. 2, 2015, which is incorporated by reference herein.

Using NFC coupling with an AMC surface reflector and a field confiner to distribute signals between various modules may provide a low cost interconnect solution. Embodiments of this disclosure provide a way to interface removable system modules without using physical/ohmic contacts.

FIG. 1 is a block diagram of an exemplary programmable logic controller 100 that uses guided NFC communication between modules. A programmable logic controller (PLC), or programmable controller, is a digital computer used for automation of typically industrial electromechanical processes, such as control of machinery on factory assembly lines, amusement rides, light fixtures, etc. PLCs are used in many machines, in many industries. PLCs are designed for multiple arrangements of digital and analog inputs and outputs, extended temperature ranges, immunity to electrical noise, and resistance to vibration and impact. Programs to control machine operation are typically stored in battery-backed-up or non-volatile memory. A PLC is an example of a "hard" real-time system since output results must be produced in response to input conditions within a limited time; otherwise, unintended operation may result. PLC systems are well known and need not be described in detail herein; e.g. see: "Programmable Logic Controller," Wikipedia, as of Dec. 1, 2015, which is incorporated by reference herein.

In this example, there are several modules that will be referred to as "line cards." Various types of line cards may be installed in a chassis or rack and configured for various purposes, such as: to control manufacturing processes, to control the heating and cooling in a building, to control medical equipment, etc. As such, electrical isolation is often needed or desirable to prevent ground loops or other interactions between various pieces of equipment that are being controlled. In the past, various types of isolation devices have been used, such as: optical isolators, transformers, etc.

In this example, there is a power supply line card 102, a data communication line card 110, and several processing line cards 120, 120-2, 120-n. While five line card modules are illustrated in FIG. 1, a typical chassis may accommodate ten or more modules. While a system using line cards is illustrated herein, embodiments of the disclosure are not limited to line cards. Various types of modules may make use of the communication techniques explained herein in order to provide reliable communication between removable modules.

In this example, supply line card 102 is coupled to a source of power and in-turn may produce one or more voltages that may be distributed via a bus 104 that may be coupled to each of the line cards via connectors such as connector 105. Typically, voltage bus(es) 104 may be included in a backplane that provides support for the connectors 105.

Data communication line card 110 may be configured to send and receive data via a communication channel to a remote host or another rack or chassis, for example. Various types of communication line card 110 may accommodate a wireless or wired interface. For example, an internet connection to a local or a wide area net may be provided by line card 110. Alternatively, a wireless connection to a Wi-Fi network or to a cellular network may be provided by line card 110.

Processing line card 120 may include, front end interface logic 130, processing logic 131, and aggregator logic 132, for example. Front end interface logic 130 may be of various types to provide interconnection to equipment that is being controlled, such as: input and output signals, RS232/422/485 compatible signals, digital signals, analog signals, etc. Various types of logic may be provided, such as: analog to digital converters (ADC), digital to analog converters (DAC), relays, contacts, etc. Processing logic 131 may include various types of hardwired and programmable logic, microcontrollers, microprocessors, memory, etc. Line cards 120-2, 120-n, etc may be identical or similar to line card 120 and may include various types and combinations of processing and interface logic as needed for a given control task.

In this example, each line card is configured to allow it to communicate with its nearest neighbor on both sides. For example, line card 110 may transmit via transmitter 111 to line card 120 which has a receiver 124. Similarly, line card 120 may transmit via transmitter 123 to receiver 115 on line card 110. At the same time, line card 120 may transmit via transmitter 122 to adjacent line card 120-n and receive via receiver 121 from adjacent line card 120-2.

In a similar manner, each line card in system 100 may communicate with each other line card in a daisy chain manner. Each line card includes an aggregator/de-aggregator logic function, such as 132 on line card 120 that allows each line card to recognize communication on the daisy chain intended for it. The aggregator/de-aggregator function also allows a line card to originate a communication packet that is then provided to the daisy chain and then propagated through adjacent line cards to a final destination on a target line card. In this embodiment, the daisy chain operates in a similar manner to an internet network protocol and each aggregator 132 functions as an internet interface. In another embodiment, a different type of known or later developed peer to peer protocol may be used.

As mentioned above, NFC may be used as the transport vehicle to communicate between each adjacent line card. As will be described in more detail below, FC segments, such as FC 115, 225 and 116, 126 may be used to guide the NFC between each adjacent line card module in order to minimize signal spreading and interface to other systems and devices.

Figure 2:
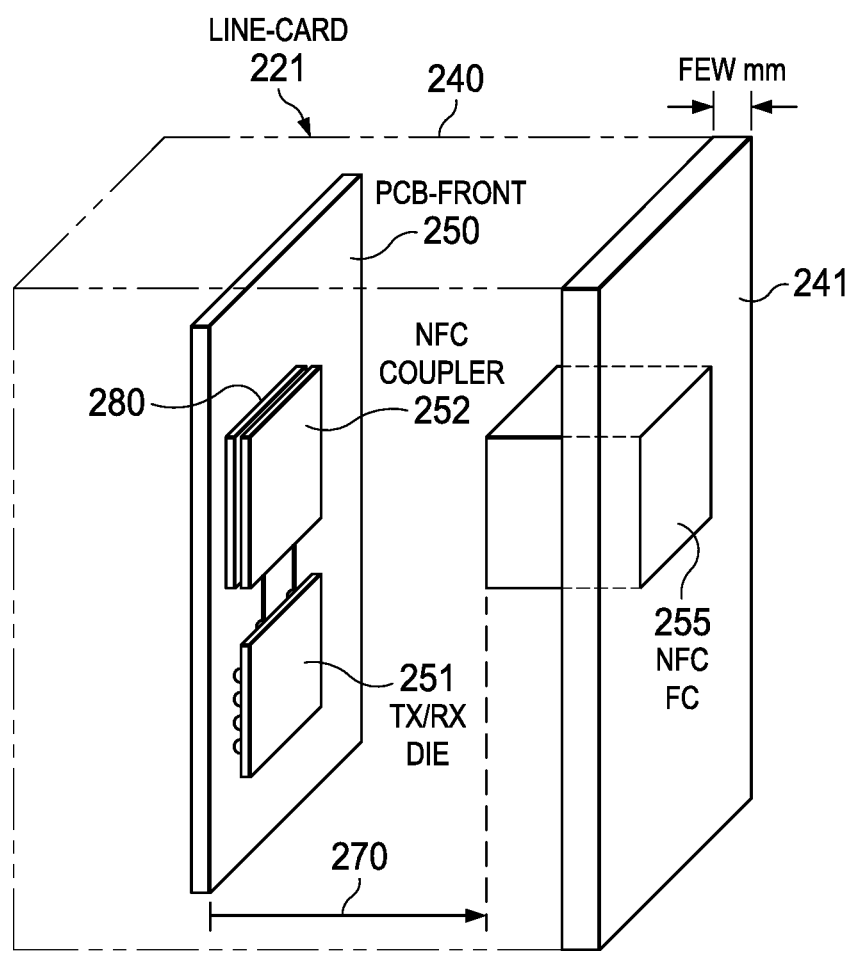
FIGS. 2-4 are more detailed illustrations of modules for the system of FIG. 1.
Figure 3:
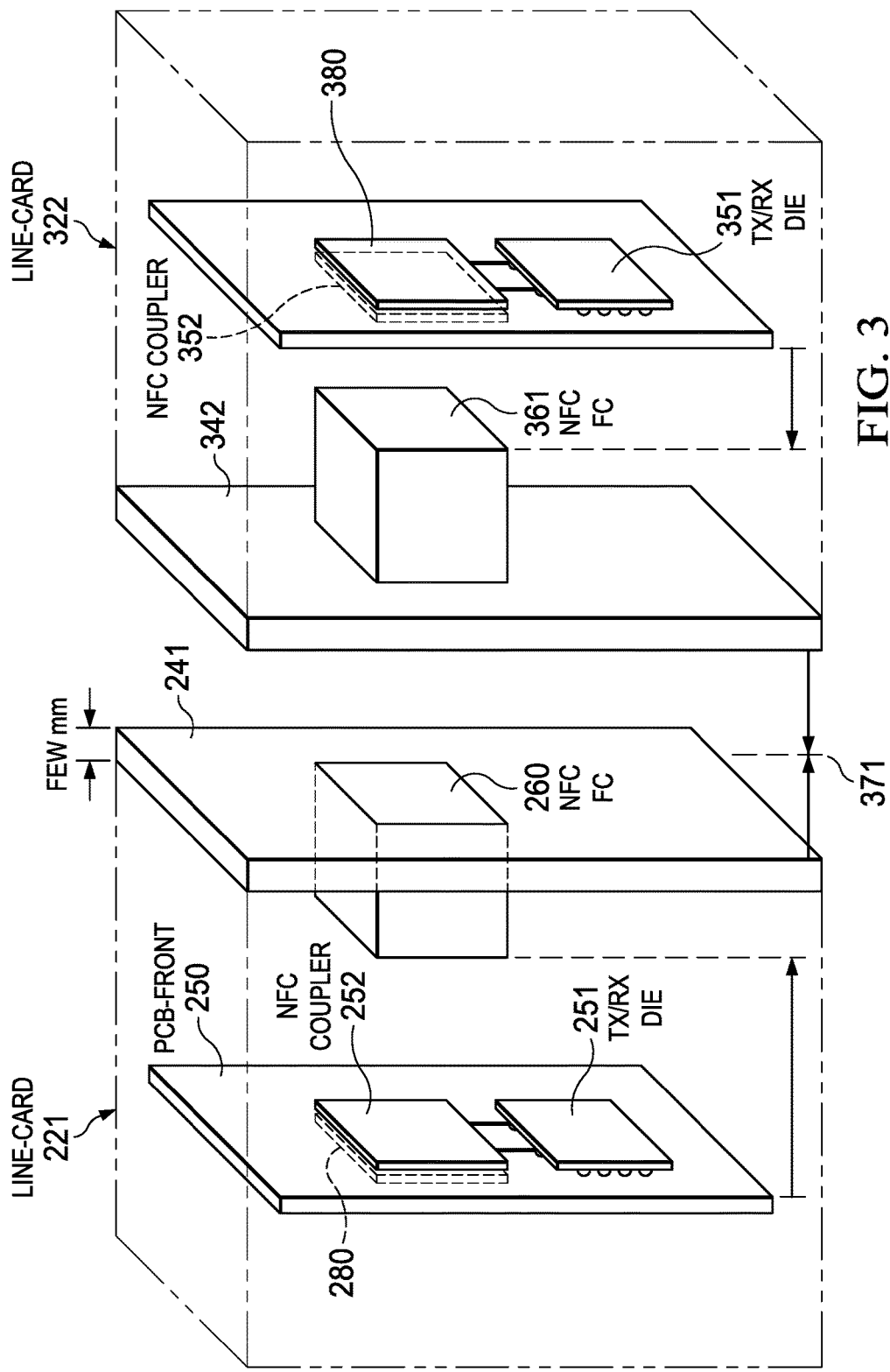

FIGS. 2 and 3 are more detailed illustrations of modules for the system of FIG. 1. FIG. 2 illustrates an example line card module 221 that is representative of the various modules 110, 120, 120-2, 120-n, etc of system 100. Module 221 may include a substrate 250 on which are mounted various circuit components, such as an integrated circuit (IC) 251 that includes transmitter(s) and receivers(s), such as transmitter 123 and receiver 124 and/or transmitter 122 and receiver 121, of line card 120, for example. In some embodiments, there may be a separate IC for each transmitter and receiver. In another embodiment, one or more receivers and transmitters may be formed in a single IC, for example.

Integrated circuit 251 may also include aggregation logic, processing logic and front end logic, or there may be additional ICs mounted on substrate 250 that contain aggregation logic, processing logic, and front end logic. Substrate 250 may be a single or a multilayer printed circuit board, for example. IC 251 and other ICs may be mounted on substrate 250 using through hole or surface mount technology using solder bumps or bonding depending on the frequency of operation, or other known or later developed packaging technologies. Substrate 250 may be any commonly used or later developed material used for electronic systems and packages, such as: fiberglass, plastic, silicon, ceramic, acrylic, etc., for example.

Substrate 250 may also include an NFC coupler 252 that is connected to the receiver and/or transmitter that is contained within IC 251. NFC coupler 252 will be described in more detail below. The coupler may be a separate structure that is mounted on substrate 250, or it may be embedded within substrate 250. Embodiments of the disclosure may operate in near field mode in which the separation between adjacent modules is a fraction of the wavelength of the frequency being transmitted by the transmitter(s) in IC 251. For example, transmission frequencies in a range of 5 GHz to 100 GHz may be used. However, some embodiments may use frequencies that are higher or lower than this range.

As will be described in more detail below, an artificial magnetic conductor (AMC) surface 280 may be positioned behind the modal launching structure 252 to redirect a backside field to the desired direction of propagation.

Near field mode may produce an evanescent field that may be used to couple two adjacent NFC couplers. Evanescent fields by nature exhibit an exponential decay with distance away from surface. By virtue of near proximity between NFC coupler 252 and another NFC coupler in an adjacent module that is only a few mm's away, enhanced by FC 260, a reasonable TX-to-RX signal coupling may be achieved using the evanescent field in near field mode while mitigating emission limits/concerns outlined per FCC Part 15.

The best analogy would be that of a transformer. A strong self-coupling between coils results in reduced leakage to the external world. Furthermore, any leakage may be considered un-intentional. The requirements for un-intentional radiation per FCC is greatly relaxed compared to those for intentional emissions.

Module 221 may be enclosed in a housing that is roughly indicated at 240. One side of the housing is illustrated as panel 241, which may be metal or plastic, for example. Typically, the housing will be a few mm thick.

An NFC field confiner 260 may be mounted to panel 241 in a position that places it approximately centered over and adjacent NFC coupler 252 when housing 240 is assembled, as indicated by motion vector 270. When housing 240 is assembled, a top surface of NFC coupler 252 will be positioned immediately adjacent a bottom surface of field confiner 260, as indicated by vector 270. In this manner, a majority of the electromagnetic energy that is emanated by NFC coupler 252 will be captured and confined by field confiner 260 and thereby directed to an adjacent module with minimal external radiation and signal loss.

Field confiner 260 may also increase the field strength of the evanescent field produced by NFC coupler 252. Field confiner 260 may also reduce radiation leakage and thereby contribute to FCC (Federal Communication Commission) compliance. Operation in the 5-100 GHz region produces cm/mm-wave frequencies that allow for relaxed spatial alignment tolerance between NFC coupler 252 and NFC field confiner 260.

Field confiner 260 may be a dielectric block, for example. Electromagnetic wave propagation through the dielectric block may be described by the wave equation, which is derived from Maxwell's equations, and where the wavelength depends upon the structure of the dielectric block, and the material within it (air, plastic, vacuum, etc.), as well as on the frequency of the wave. Field confiner 260 may be able to confine the field emitted by NFC coupler 252 by having a permittivity and/or permeability that is significantly greater than surrounding materials and/or air which will significantly reduce the wavelength of the electromagnetic field emitted by NFC coupler 252. For example, field confiner 260 may be a dielectric block that has a relative permittivity greater than approximately 2.0. Similarly, field confiner 260 may be a dielectric block that has a relative permeability greater than approximately 2.0.

Similarly, field confiner 260 may be able to confine the field emitted by NFC coupler by having a permittivity and/or permeability that is significantly lower than surrounding materials and/or air which will significantly increase the wavelength of the electromagnetic field emitted by NFC coupler 252. For example, field confiner 260 may be constructed from a negative index metamaterial that causes a significant reduction in wavelength of the electromagnetic field emitted by NFC coupler 252.

In another embodiment, field confiner 260 may be able to confine the field emitted by NFC coupler 252 by having a permittivity and/or permeability that is only slightly greater than surrounding materials and/or air which will reduce the wavelength of the electromagnetic field emitted by NFC coupler 252. For example, field confiner 260 may be a dielectric block that has a relative permittivity greater than approximately 1.0 if the surrounding material is air. Similarly, field confiner 260 may be a dielectric block that has a relative permeability greater than approximately 1.0 if the surrounding material is air.

In another embodiment, field confiner 260 may have a conductive layer around the periphery to further confine and direct an electromagnetic field radiated by NFC coupler 252. The conductive layer may use a metallic or non-metallic conductive material to form sidewalls around confiner 260, such as: metals such as copper, silver, gold, etc., a conductive polymer formed by ionic doping, carbon and graphite based compounds, conductive oxides, etc., for example.

Depending on the material and thickness of module wall 241, field confiner 260 may be simply mounted to the inside surface of module wall 241 such that the radiated signal passes through module wall 241. In some embodiments, a window may be provided in module wall 241 so that an outer surface of field confiner 260 may be mounted flush, slightly indented, or slightly proud of an outside surface of module wall 241, for example. The general location on the surface of the housing where the field confiner is located will be referred to herein as a "port."

In another embodiment, field confiner 260 may be mounted directly on substrate 250 such that it covers over NFC coupler 252 and is configured to span between the substrate and side panel 241 when housing 240 is assembled.

FIG. 3 illustrates a portion of a second module 322 that may be located adjacent module 221. Module 322 may have a housing that includes a panel 342, that will be referred to as a "left" panel. Module 221 may have a panel 241 that will be referred to as a "right" panel. Module 322 may include a substrate 350 that holds various ICs, such as IC 351 that may include a receiver and transmitter, an NFC coupler 352 that may be similar to coupler 252, referring back to FIG. 2, and an AMC surface 380 that will be described in more detail below. Module 322 may also include a field confiner 361 that is mounted on left panel 342 or on substrate 350 and in alignment with the NFC coupler on substrate 350.

When module 221 and module 322 are installed in a chassis, right panel 241 will be in close proximity to left panel 342, as indicated at 371. Field confiner 260 of module 221 and field confiner 355 of module 322 are configured so that they are in approximate alignment with each other. In this manner, a signal that is generated by a transmitter in IC 251 may be provided to coupler 252, radiated into field confiner 260 and thereby directed to field confiner 361 and then received by coupler 352 on substrate 350 and thereby provided to a receiver in IC 351.

Module 221 or 322 may be easily removed from or inserted into a chassis without any wear and tear on contacts that were previously required to communicate signals between modules. Furthermore, dielectric field confiners 260, 361 provide complete electrical isolation between module 221 and module 322. An additional isolation mechanism is not required.

Figure 4:
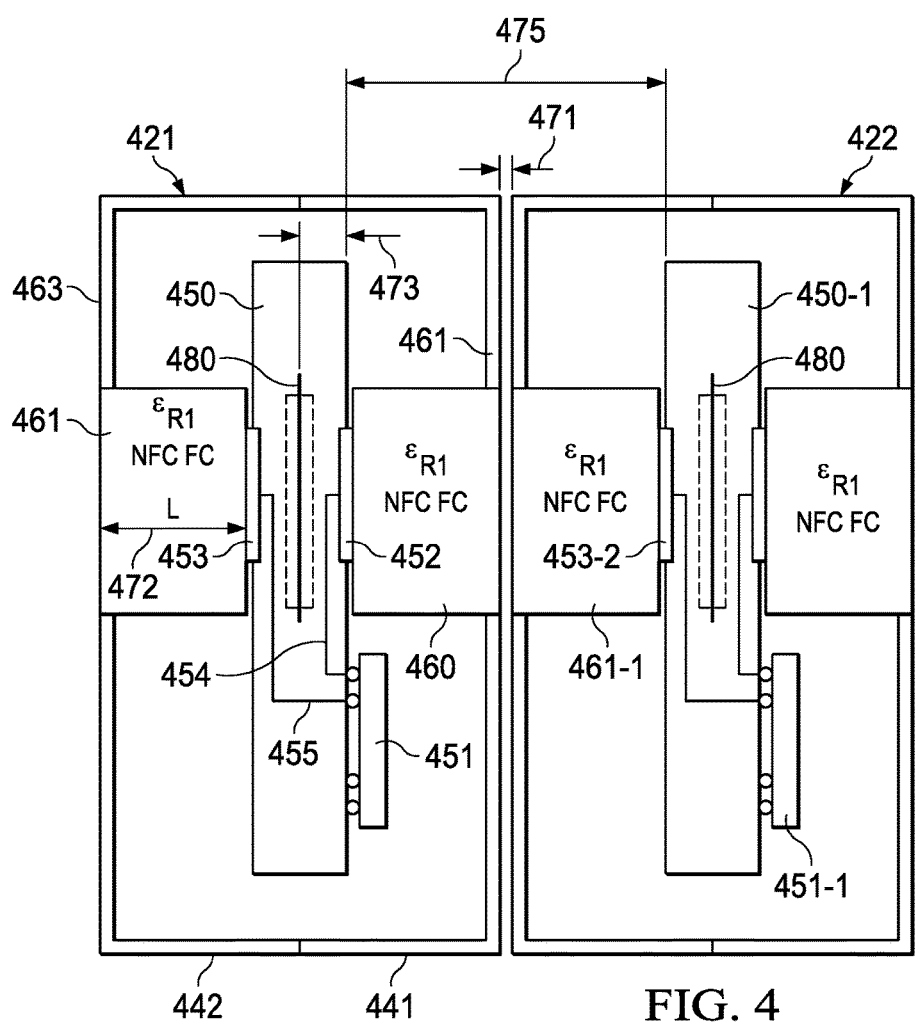

FIG. 4 is a more detailed illustration of two modules 421, 422 that are similar to modules 221, 322 of FIG. 3. This view is representative of a cross sectional view of the modules looking towards the backplane. In this example, modules 421, 422 are packaged in plastic housings that each may be formed as two "clam shells" as indicated at 441, 442. While two package elements are illustrated here, other embodiments may be assembled using various configurations of packaging that may have more than two parts, for example.

Each module may have one, or more, substrates, such as substrate 450. In this example, substrate 450 is a multilayer printed wiring board (PWB); however, other embodiments may use two PWBs mounted back to back, for example. One or more ICs 451 are mounted on substrate 450 and contain the transmitter and receiver, as described above in more detail. Processing logic and aggregator logic may also be included in the one or more ICs 451. A "left" NFC 453 is formed on the left surface of substrate 450 and a "right" NFC coupler 452 is formed on the right surface of substrate 450. Left NFC coupler 453 may be coupled to a receiver in IC 451 via a stripline 455 formed on one or more layers of substrate 450. Similarly, right NFC coupler 452 may be coupled to transmitter in IC 451 via a stripline 454 formed on one or more layers of substrate 450. The striplines may be single ended or differential, as will be described in more detail below.

A shield 480 may be provided between left NFC coupler 453 and right NFC coupler 452 to minimize "back scatter" of the field produced by each NFC coupler. Shield 480 may be an artificial magnetic conductor (AMC) structure, for example. AMC 480 may include several conductive layers, as will be described in more detail below. AMC structures are typically realized based on periodic dielectric substrates and various metallization patterns. One of the conductive layers of AMC 480 may be connected to a ground reference for the module.

Due to the magnet field zero phase shift characteristics of AMC 480 within its useful bandwidth, little or no spacing 473 is required between AMC 480 and each coupler 452, 453 in order for a reflected electric field from AMC 480 to be combined with an electric field oriented in a desired direction toward the port region of module 421. Conversely, if a simple ground plane shield is used as an electric field reflector to produce a reflected electric field with a phase shift of 90°, then the ground plane shield would need to be spaced apart from each coupler 452, 453 by a distance of approximately lambda/4, where lambda is the wavelength of the signal being emitted by the couplers, in order for the reflected field to combine correctly with the forward facing field. For example, the wavelength of a 30 GHz signal in a dielectric having an $\varepsilon_R$ of 1 is approximately 10.0 mm. In this example, substrate 450 is a typical PWB material that has an $\varepsilon_R$ of approximately 1.0. Therefore, an electric field reflector needs to be spaced away from each coupler by a distance 473 of approximately 2.5 mm, in a system operating at 30 GHz. Lower frequency operation may require larger spacing. Thus, the use of AMC 480 to provide magnetic field reflection may allow the use of thinner substrates and modules that make use of NFC.

As discussed above, NFC field confiners 460, 461 may be positioned above each NFC coupler 452, 453 and operate to confine a majority of the field radiated from each coupler. In this example, each NFC field confiner is a simple block of dielectric material, which will be referred to as a "field confiner" (FC) herein. Common dielectric materials have a relative permittivity ($\varepsilon_R$) of approximately 2-3, for example. The exact size of the block is not critical.

When module 421 and module 422 are placed adjacent to each other, the NFC port of module 421 formed by NFC coupler 452 and FC 460 and the NFC port of module 422 formed by NFC coupler 453-2 and FC 461-1 will form an electro-magnetic (EM) coupling that allows a signal generated by a transmitter in IC 451 to be EM coupled from NFC coupler 452 to NFC coupler 453-2 via FC 460 and 461-1 and then provided to a receiver in IC 451-1. A similar process may be used to transmit a signal from a transmitter in IC 451-1 to a receiver in IC 451 by using a second set of NFC couplers or by sharing NFC couplers 452, 453-2s.

In this example, the FC protrude through an opening in the housing wall and the outside surface edge of FC 460 and 461-1 are flush with the outside surface of the housing, such that the gap 471 between housings of module 421 and 422 determines the gap between FC 460 and 461-1. Minimizing the gap will minimize the amount of radiated energy the escapes while crossing the gap.

In another embodiment of a module 421, NFC field confiners 460, 461 may be configured to stop at the inside surface of module housing panels 441, 442. In this case, the dielectric characteristics of housing panels 441, 442 may be chosen to be approximately equal to the dielectric characteristics of NFC field confiners 460, 461, for example.

Alternatively, the outside surface of the NFC field confiners may stand proud of the outside surface of the housing panel. In this manner, the gap between adjacent NFC field confiners may be reduced.

In another embodiment, a flexible, non-conducting layer may be added to one or both surfaces of adjoining NFC field confiners of modules in order to fill the gap between modules. An example of a rubbery material with dielectric constant 2.5 to 3.5 is Silicone. Other materials with similar characteristics that may be used fall into two types: unsaturated rubber and saturated rubber.

Unsaturated rubbers include: Synthetic polyisoprene, Polybutadiene, Chloroprene rubber, Butyl rubber, Halogenated butyl rubbers, Styrene-butadiene Rubber, Nitrile rubber, Hydrogenated Nitrile Rubbers, etc, for example.

Saturated rubbers include: EPM (ethylene propylene rubber), EPDM rubber (ethylene propylene diene rubber), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) fluoro rubber, fluorocarbon rubber, Perfluoroelastomers (FFKM), Polyether block amides (PEBA), Chlorosulfonated polyethylene synthetic rubber (CSM), Ethylene-vinyl acetate (EVA), etc, for example.

Figure 5A:
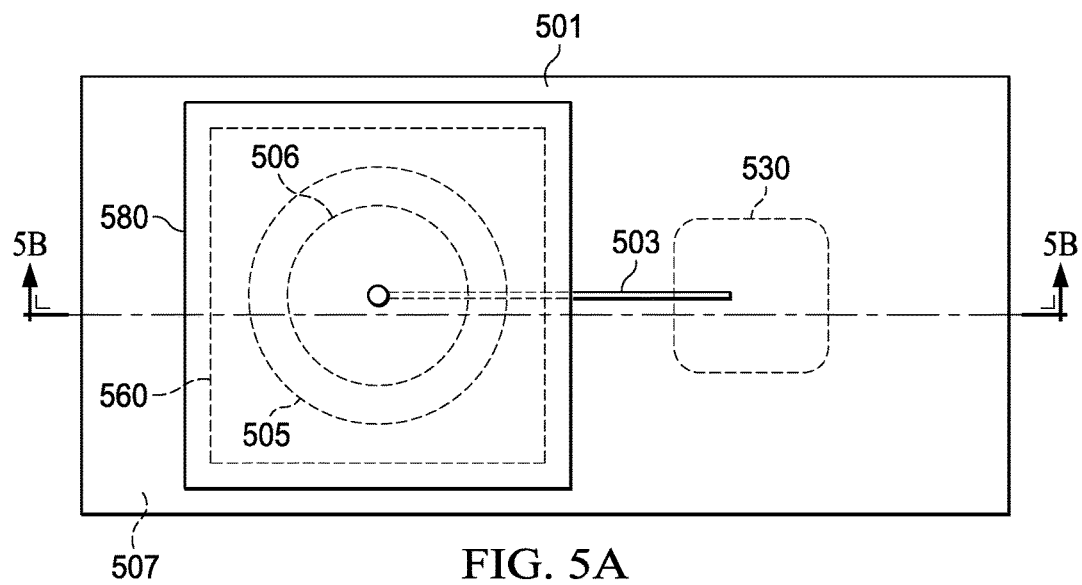
FIGS. 5A, 5B, 6A, 6B, 7A, 7B, and 8 are illustrations of exemplary modal launching structures.
Figure 5B:
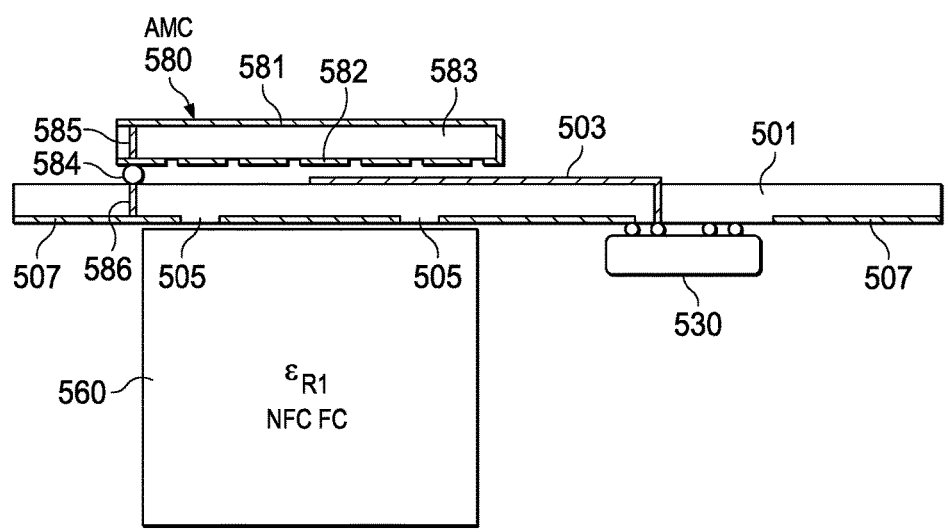

FIGS. 5A, 5B, 6A, 6B, 7A, 7B, and 8 are illustrations of exemplary modal launching structures. FIG. 5A is a bottom view and FIG. 5B is an edge view of substrate 501. Substrate 501 is representative of a portion of a substrate in one module on which an NFC field coupler is formed, such as substrate 450 in module 421 of FIG. 4, for example. NFC field confiner 560 is positioned adjacent substrate 501 and roughly aligned with the NFC field coupler formed thereon.

In this example, at least a portion of the bottom side of substrate 501 is covered by a conductive layer, such as a copper layer. The NFC field coupler is formed by etching a circular slot 505, leaving the conductive outer portion 507 and a conductive inner portion 506. On the top side of substrate 501, stripline line 503 is arranged to bring a signal generated by a transmitter within IC 530 that is mounted on the substrate, as described in more detail above. Stripline line 503 passes over slot 505 and terminates over conductive inner portion 506. This arrangement will excite a traveling wave mode that goes around in a circle on the slot 505 in response to an RF signal on stripline line 503. This configuration will excite a wide band field structure with a large near field that will extend in a perpendicular direction from the slot structure. In another embodiment, the top and bottom layers of substrate 501 may be reversed.

In another embodiment, there may be two stripline lines in place of stripline line 503 that are arranged to provide a differential excitation signal to circular slot 505, as described in more detail in U.S. Pat. No. 9,590,699, entitled "Guided Near Field Communication for Short Range Data Communications," Swaminathan Sankaran et al, granted Mar. 7, 2017, and which is incorporated by reference herein.

AMC structure 580 may be placed on the "back side" of substrate 501 that is opposite to FC 560. In this example, AMC structure 580 is formed as a separate component that is then mounted on substrate 501 using a set of solder bumps such as illustrated at 584. AMC structure 580 may include two conductive layers 581, 582 separated by a dielectric layer 583. Layer 581 may cover the entire backside of AMC structure 580 and be coupled to ground reference layer 507 through via(s) 585 through dielectric 583, solder bumps 584, and via(s) 586 in substrate 501.

In another embodiment, AMC structure 580 may be formed using conductive layers that are part of substrate 501. For example, referring back to FIG. 4, AMC structure 480 is fashioned from three conductive layers within substrate 450. A central conductive layer and two outer patterned layers embody two AMC surfaces that are back-to-back and provide magnetic reflection for modal antenna 452 and also for modal antenna 453.

Referring to FIG. 4, a mirror image structure may be formed in a substrate for another module, such as substrate 450-1 of module 422 as shown in FIG. 4, and will couple with the large near field produced by slot 505. Field confiners 460, 461-1 act to confine the field within the limits of field confiners 460, 461-1. In this manner, a signal generated by a transmitter in IC 451 mounted on substrate 450 may be EM coupled to a coupling structure on substrate 450-1 and passed to a receiver in IC 451-1 mounted on substrate 450-1 without physical ohmic connectors and with minimal escaped radiation.

Figure 6A:
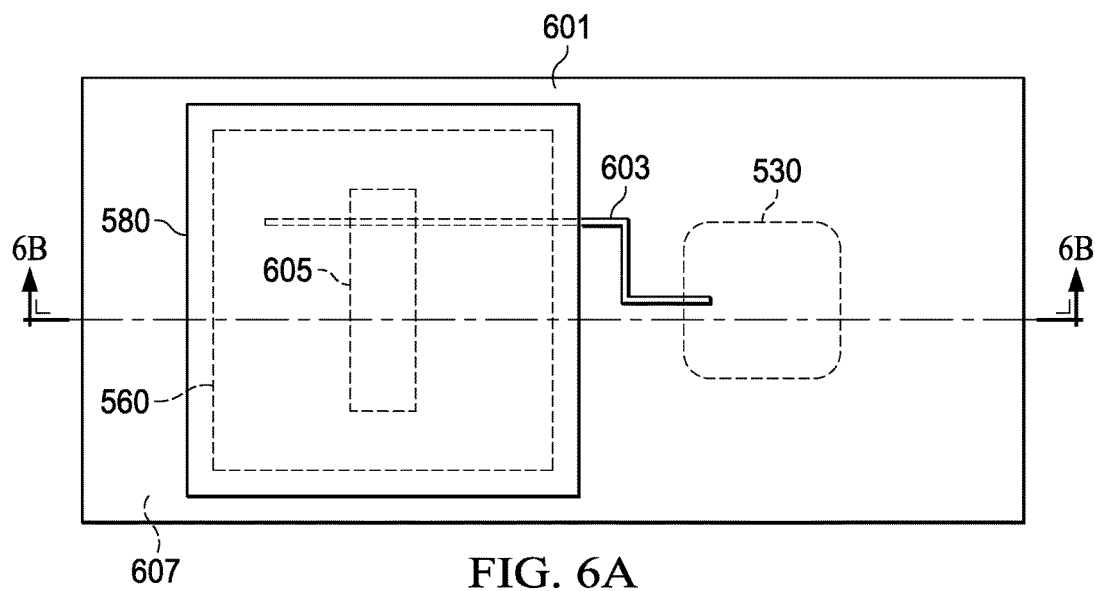
Figure 6B:
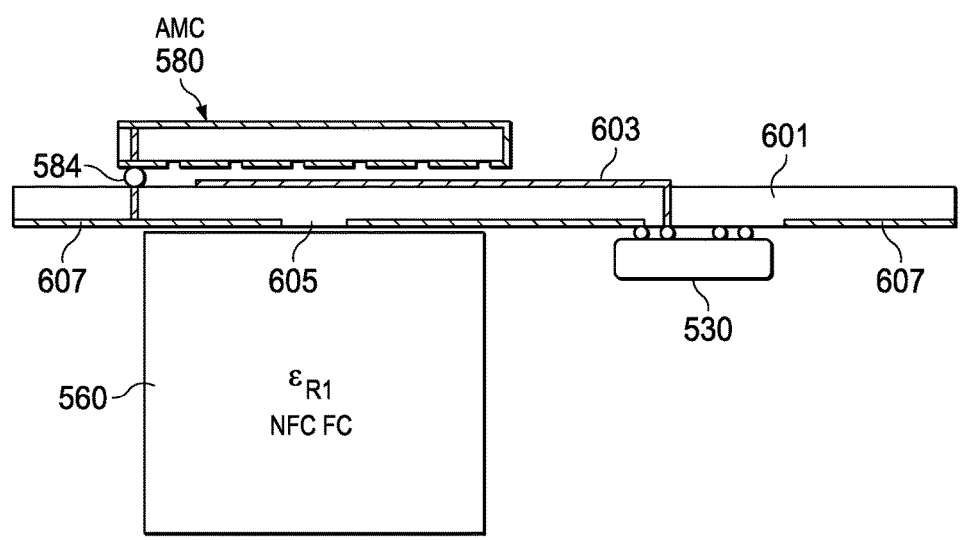

FIG. 6A is a bottom view and FIG. 6B is an edge view of substrate 601. Substrate 601 is representative of a portion of a substrate in one module on which an NFC field coupler is formed, such as substrate 450 in module 421 of FIG. 4, for example. NFC field confiner 560 is positioned adjacent substrate 601 and roughly aligned with the NFC field coupler formed thereon.

In this example, at least a portion of the bottom side of substrate 601 is covered by a conductive layer, such as a copper layer. The NFC field coupler is formed by etching a straight slot 605, leaving the conductive outer portion 607. On the top side of substrate 601, stripline line 603 is arranged to bring a signal generated by a transmitter within IC 530 that is mounted on the substrate, as described in more detail above. Stripline line 603 passes over slot 605 and terminates over conductive outer portion 606. This arrangement will excite a hybrid TE mode on the slot 605 in response to an RF signal on stripline line 603. This configuration will excite a wide band field structure with a large near field that will extend in a perpendicular direction from the slot structure. In another embodiment, the top and bottom layers of substrate 601 may be reversed.

AMC structure 580 may be placed on the "back side" of substrate 601 that is opposite to FC 610. In this example, AMC structure 580 is formed as a separate component that is then mounted on substrate 601 using a set of solder bumps such as illustrated at 584. AMC structure 620 may include two conductive layers separated by a dielectric layer, as described in more detail above.

Figure 7A:
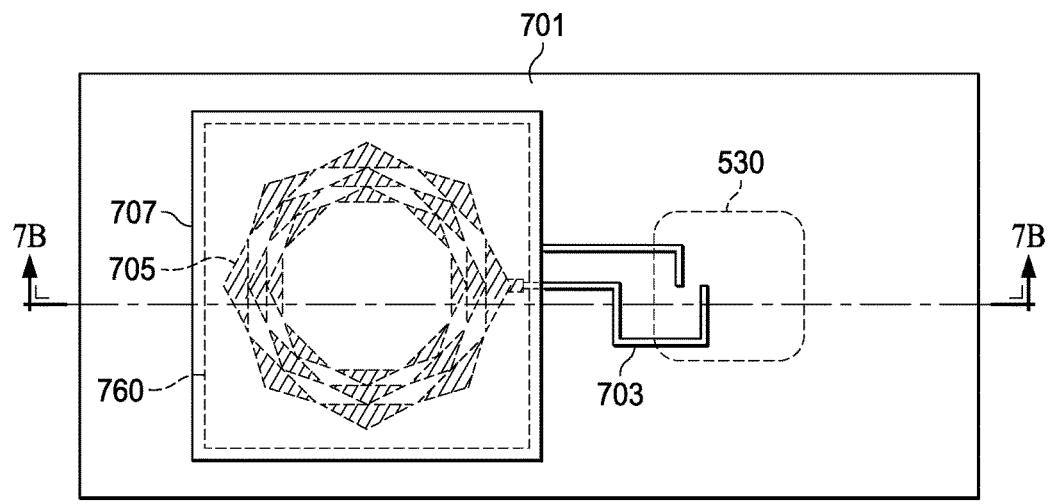
Figure 7B:
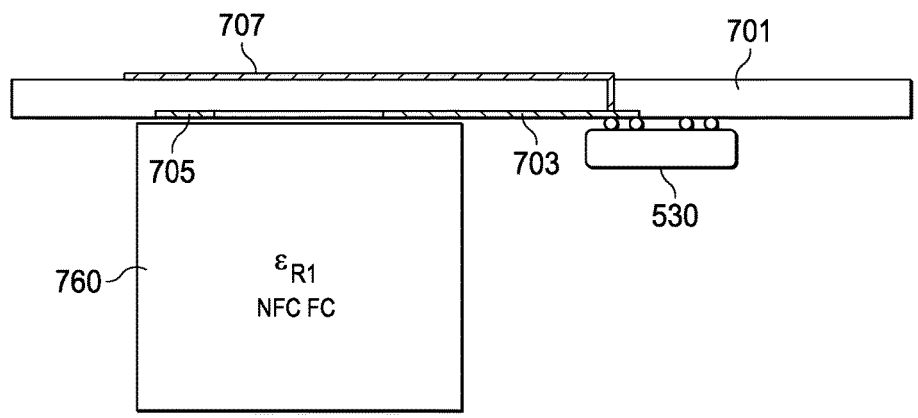

FIG. 7A is a top view and FIG. 7B is an edge view of substrate 701. Substrate 701 is representative of a portion of a substrate in one module on which an NFC field coupler is formed, such as substrate 450 in module 421 of FIG. 4, for example. NFC field confiner 760 is positioned adjacent substrate 701 and roughly aligned with the NFC field coupler formed thereon.

In this example, at least a portion of the bottom side of substrate 701 is covered by a conductive layer, such as a copper layer 707. On the top side of substrate 701, a fractal pattern 705 is patterned from a conductive layer. A stripline line 703 is arranged to bring a signal generated by a transmitter within IC 530 that is mounted on the substrate, as described in more detail above. Stripline line 703 is coupled to conductive fractal pattern 705. This arrangement will excite a traveling wave in response to an RF signal on stripline line 703. This configuration will excite a wide band field structure with a large near field that will extend in a perpendicular direction from the fractal structure.

In this example, an AMC structure is not needed since solid conductive layer 707 provides electric field reflection of the field formed by fractal pattern 705. However, as described above, the distance between reflective layer 707 and fractal pattern 705 should be approximately lambda/4 of the operating frequency for best results.

Figure 8:
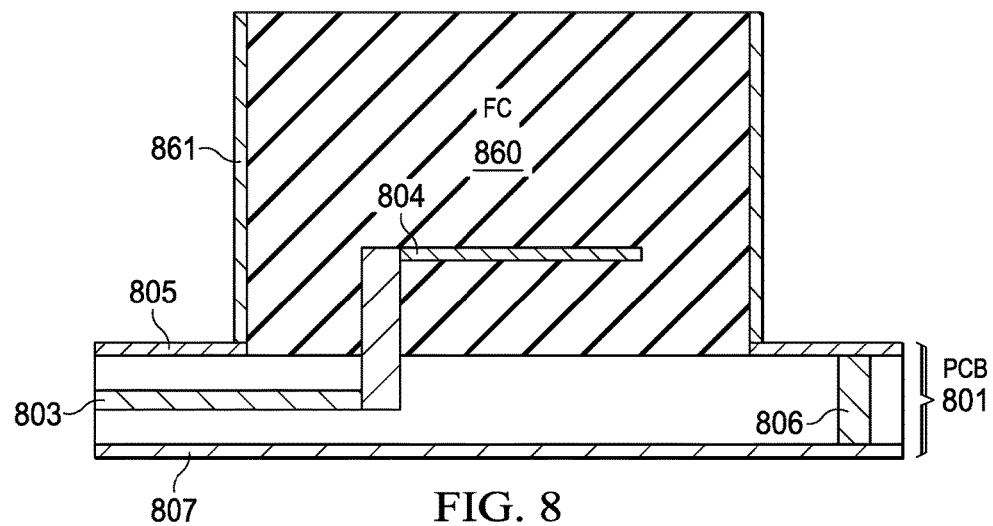

FIG. 8 is an edge view of substrate 801. Substrate 801 is representative of a portion of a substrate in one module on which an NFC field coupler is formed, such as substrate 450 in module 421 of FIG. 4, for example. NFC field confiner 860 is positioned adjacent substrate 801 and roughly aligned with the NFC field coupler formed thereon.

In this example, at least a portion of the bottom side of substrate 801 is covered by a conductive layer, such as a copper layer 807. On the top side of substrate 801, another conductive layer may be patterned to contact a conductive outer surface of FC 860. A stripline line 803 is arranged to bring a signal generated by a transmitter that is mounted on the substrate to a straight wire antenna 804 that may be positioned within a lower region of FC 860.

In this example, an AMC structure is not needed since solid conductive layer 807 provides electric field reflection of the field formed by wire antenna 804. However, as described above, the distance between reflective layer 807 and wire antenna 804 should be approximately lambda/4 of the operating frequency for best results. Elevating wire antenna 804 into a lower region of FC 860 allows the thickness of substrate 801 to be minimal while still providing the required separation between wire antenna 804 and electric field reflector 807.

In another embodiment, an AMC may be positioned below wire antenna 804 in place of ground plane 807. In this case, the separation of wire antenna 804 and the AMC is not critical since the electromagnetic reflections from the AMC are in-phase with the main portion of the electromagnetic wave emanated from wire antenna 804.

This arrangement will excite a TE mode in response to an RF signal on stripline line 803. This configuration will excite a wide band field structure with a large near field that will extend in a perpendicular direction from the wire antenna structure.

Figure 9:
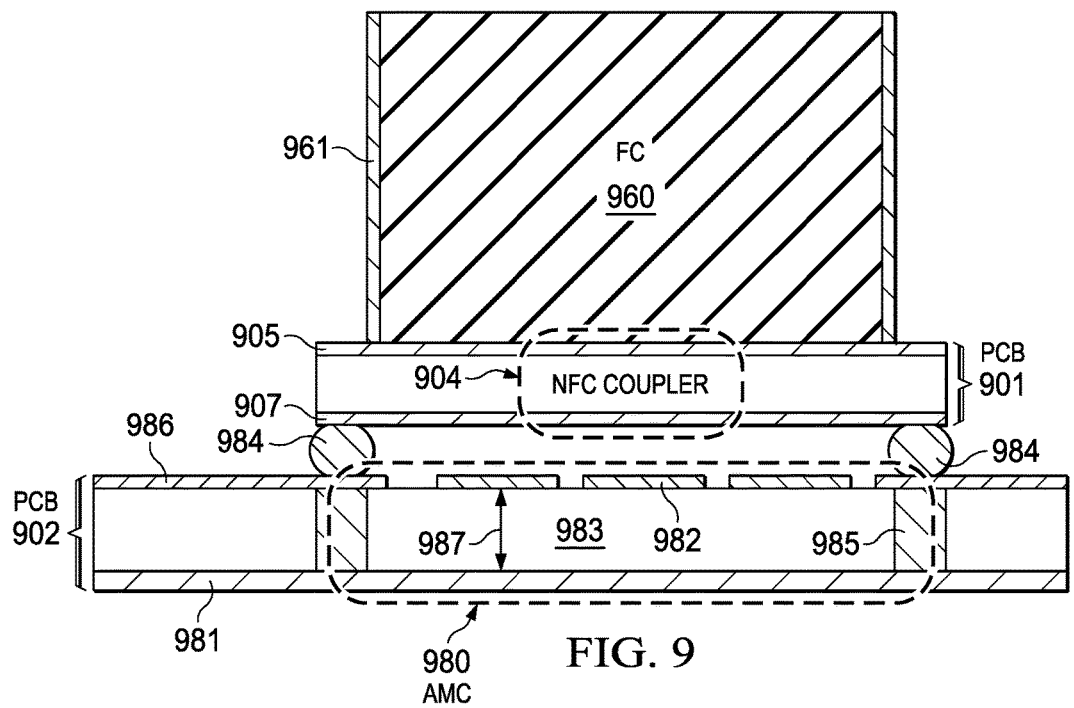
FIGS. 9 and 10 are views of an example artificial magnetic conductor surface.
Figure 10:
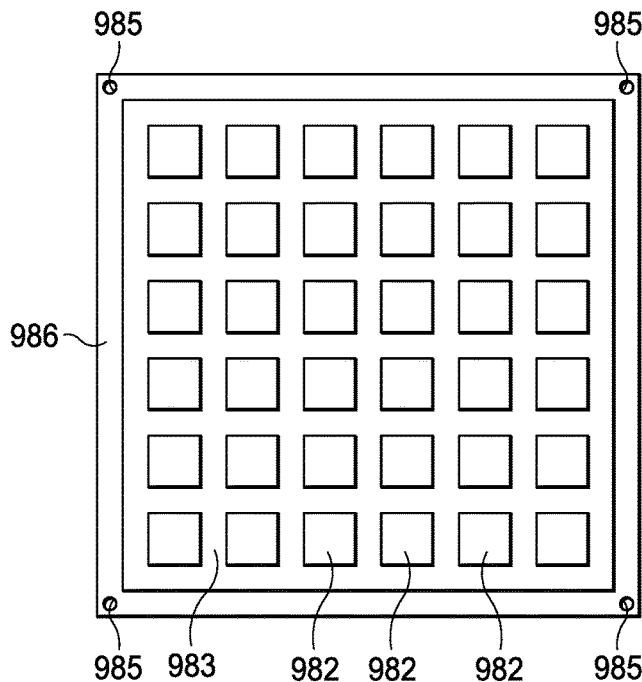

FIGS. 9 and 10 are views of an example artificial magnetic conductor surface. An AMC, also known as a high-impedance surface, is a type of electromagnetic band gap (EBG) material or artificially engineered material with a magnetic conductor surface for a specified frequency band. Various types of AMC surfaces have been used as a ground plane for a low profile antenna, such as: a mushroom-like EBG, uniplanar compact EBG (UCEBG), Peano curve, and Hilbert curve. See, for example, J. R. Sohn, K. Y. Kim, and H.-S. Tae, COMPARATIVE STUDY ON VARIOUS ARTIFICIAL MAGNETIC CONDUCTORS FOR LOW-PROFILE ANTENNA, 2006.

AMC surfaces have very high surface impedance within a specific limited frequency range, where the tangential magnetic field is small, even with a large electric field along the surface. Therefore, an AMC surface can have a reflection coefficient of +1, which is in-phase reflection. Generally, the reflection phase is defined as the phase of the reflected electric field which is normalized to the phase of the incident electric field at the reflecting surface. It can be called in-phase reflection, if the reflection phase is 00. In practice, the reflection phase of an AMC surface varies continuously from +1800 to −1800 relative to the frequency, and crosses zero at just one frequency (for one resonant mode). However, a useful bandwidth may be obtained using known design techniques. Thus, due to this unusual boundary condition, in contrast to the case of a conventional metal plane, an AMC surface can function as a reflective surface for low-profile modal antennas in an NFC system. For example, even though a horizontal modal antenna is extremely close to an AMC surface, the current on the antenna and its image current on the ground plane are in-phase, rather than out-of phase, thereby strengthening the radiation.

FIG. 9 is an edge view of substrate 901 which is attached to a second substrate 902. Substrate 901 is representative of a portion of a substrate in one module on which an NFC field coupler is formed, such as substrate 450 in module 421 of FIG. 4, for example. NFC field confiner 960 is positioned adjacent substrate 901 and roughly aligned with NFC field coupler 904 formed thereon. FC 960 may have conductive sidewalls 961 that may be coupled to reference layer 905.

NFC coupler 904 may be implemented similarly to the examples of FIG. 5A, 6A, or 8, for example. Transmitter and/or receiver circuitry may be mounted on substrate 901 and coupled to NFC coupler 904 as described in more detail above. Conductive layer 907 may be patterned as described above to form NFC coupler 904. Layer 907 may be coupled to a ground reference.

AMC structure 980 may be placed on the "back side" of substrate 901 that is opposite from FC 960. In this example, AMC structure 980 is formed as a separate component that is then mounted on substrate 901 using a set of solder bumps such as illustrated at 984. AMC structure 980 may include two conductive layers 981, 982 separated by a dielectric layer 983. Layer 981 may cover the entire backside of AMC structure 980 and be coupled to ground reference layer 907 through via(s) 985 through dielectric 983, and solder bumps 984.

In another embodiment, AMC structure 980 may be formed using conductive layers that are part of substrate 901. Since AMC structure 980 reflects electromagnetic fields produced by NFC coupler 904 with no phase shift, AMC structure 980 does not need to be spaced away from NFC coupler 904.

FIG. 10 is a top view of substrate 902. In this example AMC, a lattice of square conductive patches 982 is patterned over dielectric layer 983. The size of the patches 982, the spacing between them, the thickness 987 of dielectric layer 983 and the permittivity/permeability of dielectric layer 983 are selected using known or later developed design parameters to form a structure that has an in-phase reflection property for an electromagnetic wave at a frequency band of interest for NFC. In some embodiments, each patch 982 may have a via connecting it to ground plane 981 (see FIG. 9). In other embodiments, there may be a narrow connecting strap positioned between each adjacent patch 982. As mentioned above, various types of AMC surfaces have been used as a ground plane for a low profile antenna, such as: a mushroom-like EBG, uniplanar compact EBG (UCEBG) Peano curve, and Hilbert curve.

Figure 11:
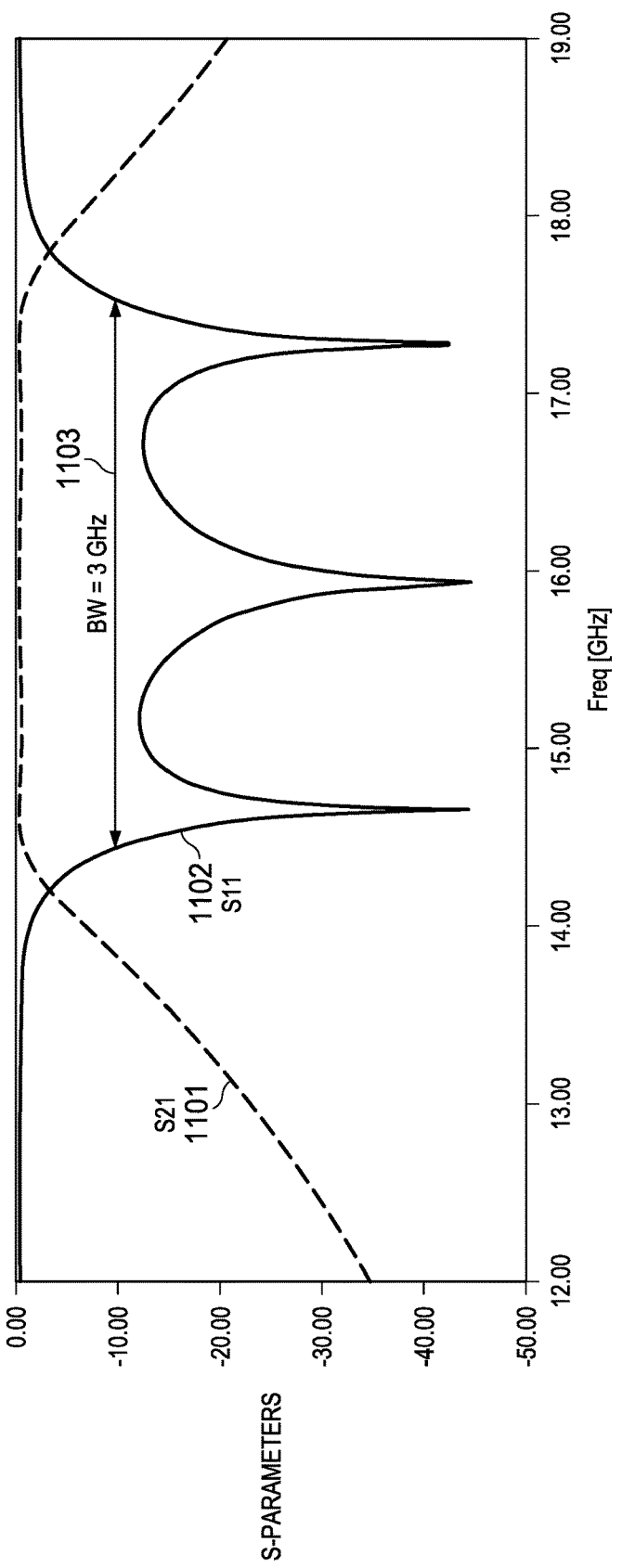
FIG. 11 is a plot illustrating performance of the slot antenna of FIG. 6A combined with an artificial magnetic conductor surface.

FIG. 11 is a plot illustrating a plot of S-parameters for of the slot antenna and field confiner of FIG. 6A combined with an artificial magnetic conductor surface 580. $S_{21}$ plot line 1101 represents the forward voltage gain across a range of frequencies from 12 GHz to 19 GHz, while $S_{11}$ plot line 1102 represents the input port voltage reflection coefficient across that range of frequencies. As shown by $S_{21}$ plot line 1101, there is approximately no loss through the slot antenna and field confiner of FIG. 6A for the 3 GHz band of frequencies 1103 centered about 16 GHz. St, plot line 1102 illustrates there is also a low reflection coefficient across the 3 GHz band 1103.

Figure 12:
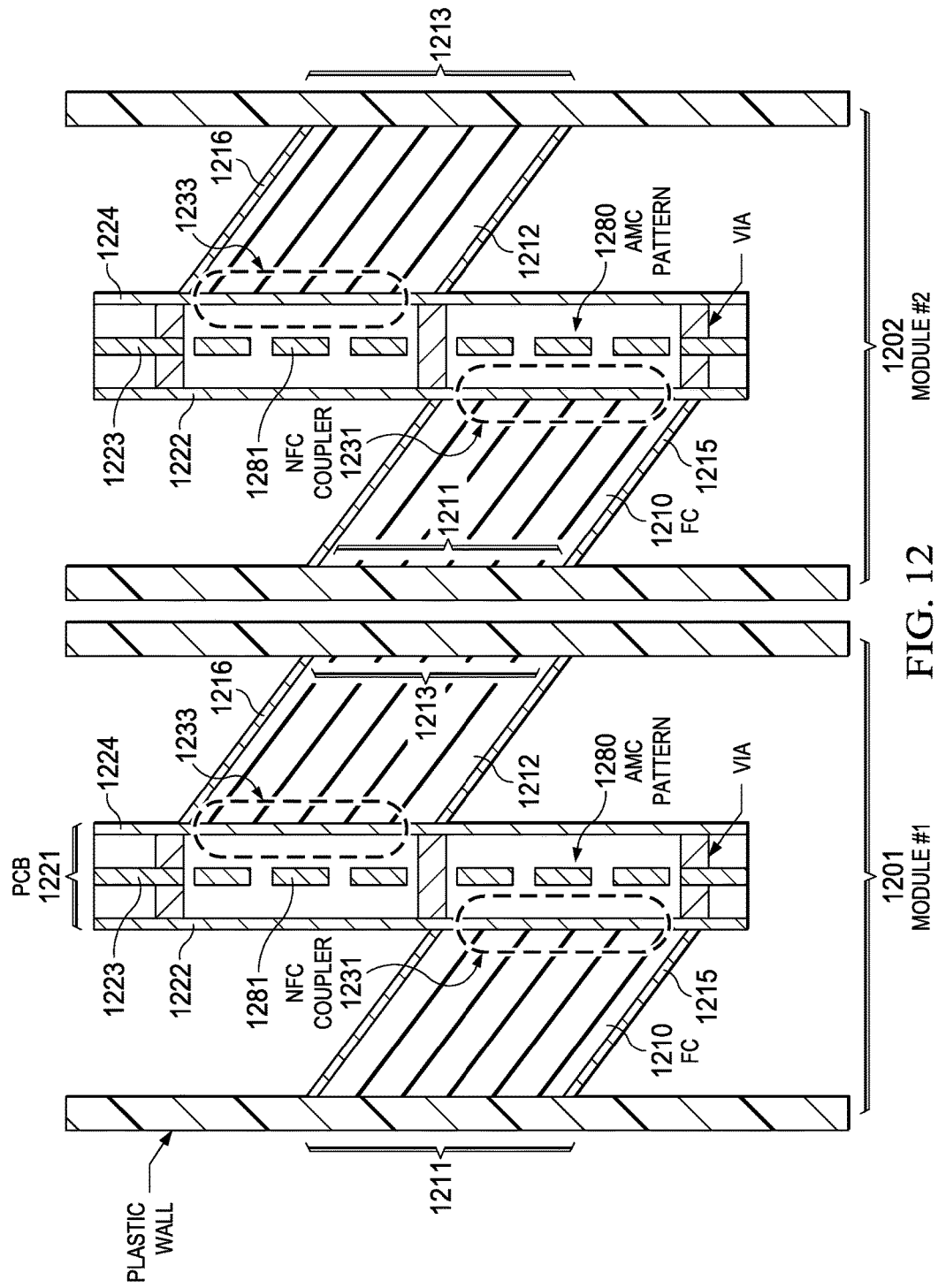
FIG. 12 is a cross section of another embodiment of modules in which NFC communication is aided with skewed field confinement modules.

FIG. 12 is a cross section of another embodiment of modules in which NFC communication is aided with skewed field confinement blocks, such as FC blocks 1210, 2012 in module 1201 and in module 1202. Substrate 1221 in module 1201 may be a multilayer printed circuit board (PCB) that includes several conductive layers separated by dielectric layers. The design and fabrication of PCBs is well known and need not be described in detail herein. In this example, PCB 1221 may have an outer conductive layer 1222 on one side, referred to herein as the "left side" and another conductive layer 1224 on the opposite side, referred to herein as the "right side." Another conductive layer 1223 in the middle of PCB 1221 may be patterned to form AMC patterns 1280, 1281 as described with regard to FIGS. 9-10. AMC pattern 1280 may interact with conductive layer 1222 to form an AMC surface. Similarly, AMC pattern 1281 may interact with conductive layer 1224 to form another AMC surface.

NFC coupler 1231 may be formed on or near the left side surface proximate to AMC 1280. NFC coupler 1231 may be a modal launching structure as described with regards to FIG. 5A, 6A, 7A, 8, etc., for example. Similarly, NFC coupler 1233 may be formed on or near the right side surface proximate to AMC 1281. NFC coupler 1233 may be a modal launching structure as described with regards to FIG. 5A, 6A, 7A, 8, etc., for example.

Module 1202 may include a PCB 1222 that has a similar configuration as PCB 1221. As described with regard to FIG. 1, modules 1221 and 1222 may include various integrated circuits and other components in order to embody various line cards, processor cards, input/output cards, etc.

NFC coupler 1231 may be offset from NFC coupler 1233 so that AMC pattern 1280 and 1281 may be fabricated in the same conductive layer 1223. However, if FC 1210 and 1212 are rectangular blocks, then port region 1211 and 1213 in adjacent modules would not align with each other. In this example, field confiners 1210 and 1212 are skewed on order for port regions 1211 and 1213 to align with adjacent modules.

In this example, each module 1201, 1202 is approximately 10 mm wide inside the plastic housing. The wall thickness of the plastic housing is approximately 1 mm and the modules are spaced apart by about 250 um when installed in a chassis. Multilayer PCB 1221, 1222 is approximately 1 mm thick. NFC coupler 1231 and 1233 are offset from each other by approximately 9 mm. Therefore, by skewing FC blocks 1210, 1212 at about a forty-five degree angle, port regions 1211 and 1213 can be located approximately opposite each other so that the port regions in adjacent modules will align with each other. In another embodiment, the angle of skew of the FC may be selected based on the width of the module, thickness of the PCB and spacing between the NFC couplers.

The outside surface 1215 of FC block 1210 and outside surface 1216 of FC block 1212 may have a conductive material layer around the periphery to further confine and direct an electromagnetic field radiated by the associated NFC coupler. This conductive layer may be coupled to a voltage reference signal, such as ground, that is included in the outer conductive layer 1222, 1224 of the PCB.

In another embodiment, a simple electric mode reflective layer may be used in place of AMC surfaces 1280, 1281. For example, conductive region in layer 1222 may act as a reflector for NFC coupler 1233, while conductive region in layer 1224 may act a reflector for NFC coupler 1231. In this case, since the electric mode reflection produces a 90 degree phase shift, the reflective layer should be spaced away from the NFC coupler by a distance of approximately one fourth of the wave length of the RF signal being transmitted.

Figure 13:
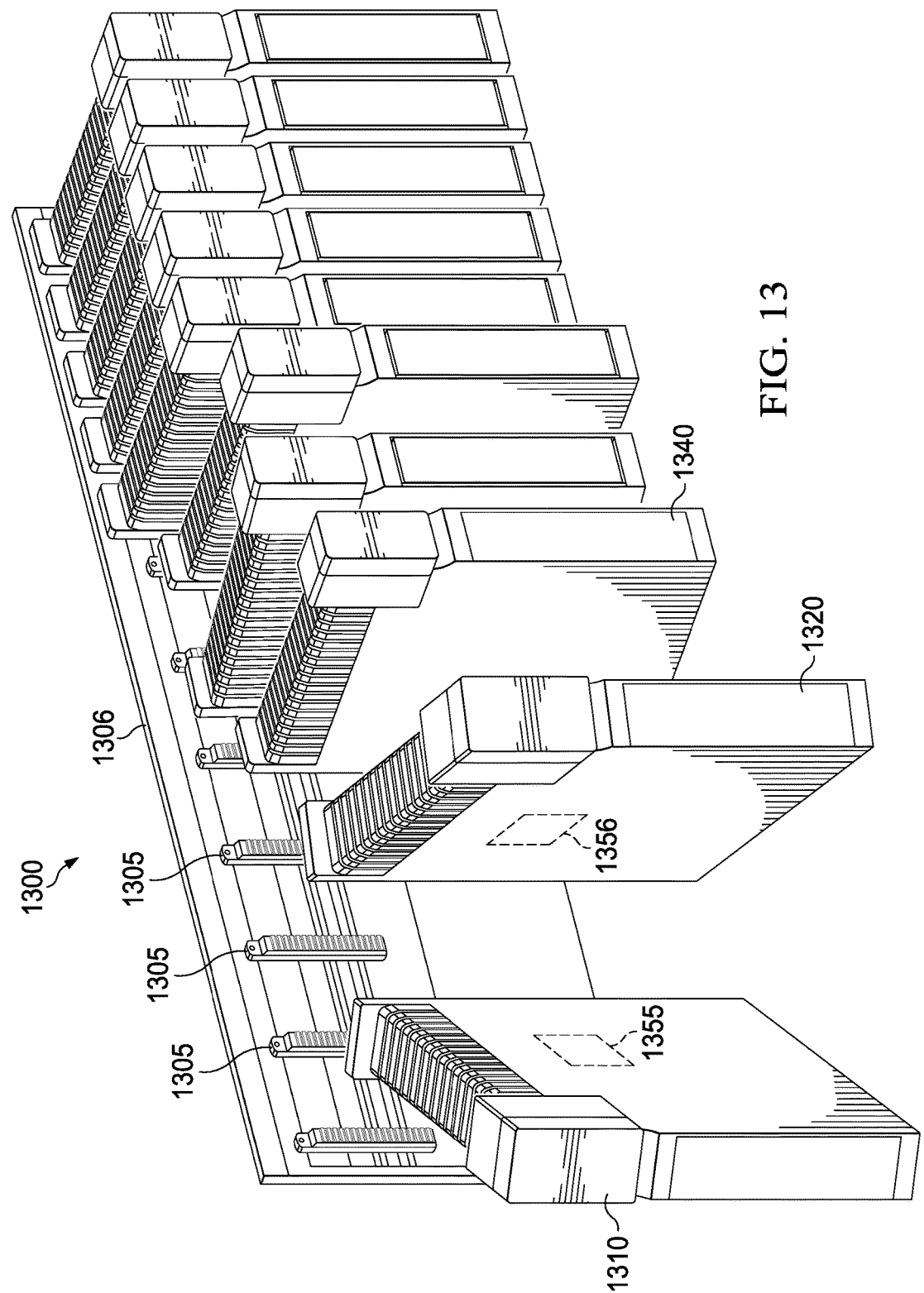
FIG. 13 is a pictorial illustration of the exemplary system of FIG. 10.

FIG. 13 is a pictorial illustration of an exemplary system 1300 that is another view of system 100 of FIG. 1. Backplane 1306 provides a set of connectors 1305 for providing power to each line card, as explained with regard to connector 105 of FIG. 1. As can be seen by the illustration, each line card module is removable from backplane 1306 by simply pulling the module to disconnect it from connector 1305. Typically, a rack or chassis will also be provided along with backplane 1306 to support the line cards when they are inserted into connectors 1305.

Each line card module is enclosed in a housing, which may be made from plastic or other suitable materials. As described in more detail above, each line card may have a NFC coupler, AMC surface, and field confiner arranged to form a contactless communication port on each side of the module. For example, module 1310 may have a port 1355 on the right side of the module while module 1320 may have a port 1356 on the left side of the module that aligns with port 1355 when both modules are plugged into backplane 1306.

Similarly, module 1320 may have another port (not shown) on the right side of the module while module 1340 may have a port (not shown) on the left side of the module that aligns when both modules are plugged into backplane 1306. All of the modules may have similar pairs of ports on both sides of each module to allow daisy chained communication among all of the modules, as described in more detail above.

Figure 14:
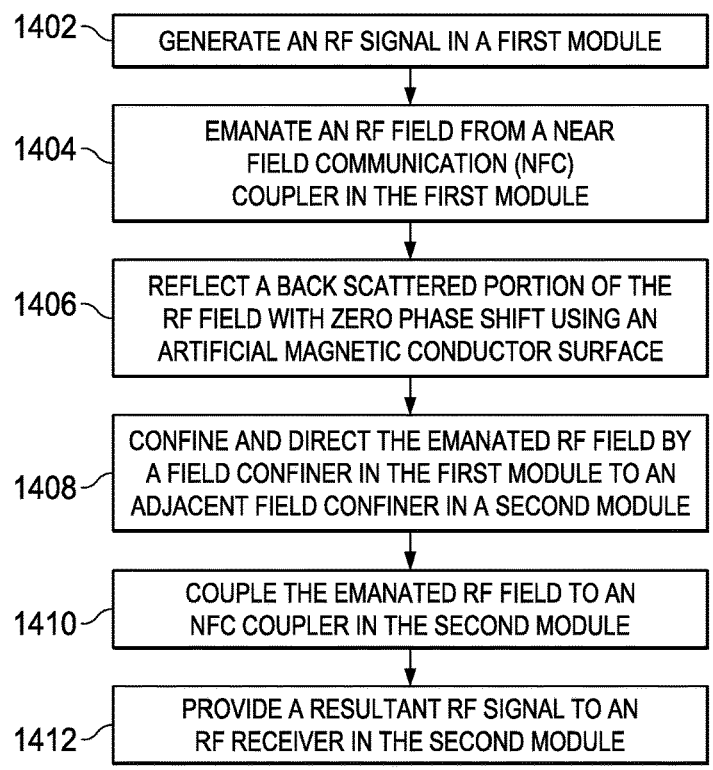
FIG. 14 is a flow chart illustrating operation of NFC between adjacent modules.

FIG. 14 is a flow chart illustrating operation of near field communication between modules, as described above in more detail. As described above in more detail, the modules may be part of a programmable logic control system used for industrial, commercial, and residential applications. A typical system may include a rack or chassis into which a set of modules are installed. Each module may communicate with an adjacent neighbor module using near field communication, in which an RF signal generated in one module may be EM coupled to a receiver in an adjacent module using radiative coupling, near field coupling, or evanescent coupling, or any combination of these modes.

For example, a radio frequency (RF) signal may be generated in a first module as shown in block 1402. In the example of FIGS. 1-13, the RF signal may have a frequency in the range of 10-30 GHz. However, other systems may use RF signals at a higher or lower frequency by adjusting the physical size of the field coupling and field confining components described herein.

An RF electromagnetic field may be emanated in response to the RF signal from a first near field communication (NFC)

coupler in the first module as shown in block 1404. The RF electromagnetic field may be the result of a traveling wave formed in a circular slot in a conductive layer, for example, as described in more detail with regard to FIGS. 5A-5B. Alternatively, the electromagnetic field may be the result of a traveling wave formed in a straight slot in a conductive layer, for example, as described in more detail with regard to FIGS. 6A-6B. In another embodiment, the electromagnetic field may be the result of a traveling wave formed by a fractal pattern, for example, as described in more detail with regard to FIGS. 7A-7B. In another embodiment, the electromagnetic field may be the result of a traveling wave formed by a straight wire, for example, as described in more detail with regard to FIG. 8.

As described above in more detail, a portion of the emanated RF field may occur on the backside of the NFC coupler. An artificial magnetic conductor surface positioned adjacent the NFC coupler may reflect the backside RF field as shown at 1406 with a zero phase shift so that it is added to the front side RF field.

The emanated RF electromagnetic field is confined and directed by a field confiner in the first module to a field confiner in a second module located adjacent the first module as shown in block 1408. As described in more detail above, the two field confiners are located in close proximity when the modules are installed in a system and thereby minimize loss of emanated energy to the surroundings. This may simplify the process of complying with FCC emission requirements, for example.

The emanated RF electromagnetic field is then coupled to a second NFC coupler in the second module is shown in block 1410. As described above in more detail, this coupling is performed by EM coupling and may use the near field of the emanated electromagnetic field. This coupling may also make use of radiated energy that is propagated from the NFC coupler to the second NFC coupler. The coupling may also make use of an evanescent field that is formed by the first NFC coupler. Depending on the spacing between the adjacent modules, one or a combination of these coupling modes may occur.

A resultant RF signal may then be provided to an RF receiver on the second module as shown in block 1412. As described above in more detail, the multiple modules in the system may communicate in a daisy chained manner such that any module may be able to communicate with any other module in the system.

A known standard communication protocol, such as the Internet Protocol (IP) may be used, treating the daisy chained NFC physical media as an Ethernet. The Internet Protocol (IP) is the principal communications protocol in the Internet protocol suite for relaying datagrams across network boundaries. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information. The first major version of IP, Internet Protocol Version 4 (IPv4), is the dominant protocol of the Internet. Its successor is Internet Protocol Version 6 (IPv6).

Another embodiment may use another known or later developed communication protocol for communication using the daisy chained NFC physical media as described herein.

In this manner, embodiments of the present disclosure may provide high throughput communication between removable modules of a system using near field communication techniques. The techniques described herein may be less expensive than alternatives such as optical couplers, for example. NFC allows contactless communication between modules and thereby eliminates the need for additional isolation in systems that may require isolation between modules.

Other Embodiments

While the disclosure has been described with reference to illustrative embodiments, this description is not intended to be construed in a limiting sense. Various other embodiments of the disclosure will be apparent to persons skilled in the art upon reference to this description. For example, while a programmable logic controller system was described, other types of modular systems may embody aspects of the present disclosure in order to improve reliability, ease of configuration, electrical isolation, etc.

While an artificial magnetic conductor surface formed by an array of square patches was illustrated herein, other forms of known or later developed AMC surfaces may be used in other embodiments. Various types of AMC surfaces include, but are not limited to: mushroom-like EBG, uniplanar compact EBG, Peano curve, Hilbert curve, etc.

While modules in which the guided NFC ports are located on the side of the module were described herein, in another embodiment a port may be located on an edge of a module with a mating port located on a backplane or other surface that is adjacent to the edge of the module, for example.

While a daisy-chained communication configuration was described herein, in another embodiment other topologies may be formed. For example, a tree topology may be formed by providing a port on the backplane that mates with an edge mounted port in each module.

While a simple dielectric block has been described herein, another embodiment may use a metallic or non-metallic conductive material to form sidewalls on the field confiner, such as: a conductive polymer formed by ionic doping, carbon and graphite based compounds, conductive oxides, etc., for example.

A dielectric or metamaterial field confiner may be fabricated onto a surface of a substrate or module panel using an inkjet printing process or other 3D printing process, for example.

While field confiners with polymer dielectric cores have been described herein, other embodiments may use other materials for the dielectric core, such as ceramics, glass, etc., for example.

While dielectric cores with a square cross section are described herein, other embodiments may be easily implemented. For example, the dielectric core may have a cross section that is rectangular, trapezoidal, cylindrical, oval, or other selected geometries.

While sub-terahertz signals in the range of 5-100 GHz were discussed herein, NFC couplers and FCs and systems for distributing higher or lower frequency signals may be implemented using the principles described herein by adjusting the physical size of the field confiner core accordingly.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. A system comprising a module, the module comprising:
a substrate;
a radio frequency (RF) transmitter mounted on the substrate;
a near field communication (NFC) coupler on the substrate, the NFC coupler coupled to the RF transmitter, the NFC coupler having a front side and a back side;
a housing surrounding the substrate, the housing having a port region on a surface of the housing; and
a field confiner, coupling the front side of the NFC coupler and the port region on the surface of the housing, arranged to propagate near-field electromagnetic energy emanated from the NFC coupler through the port region on the surface of the housing;
wherein the port region on the surface of the housing has an opening whose cross-section is:
parallel to the NFC coupler; and
offset laterally from the NFC coupler.

2. The system of claim 1, wherein the field confiner is skewed at an angle of at least 45 degrees.

3. The system of claim 1, the module further comprising:
a second port region on a second surface of the housing;
a second RF transmitter mounted on the substrate;
a second NFC coupler on the substrate, the second RF transmitter coupled to the second RF transmitter, wherein the second NFC coupler has a front side and a back side;
a second field confiner, coupling the front side of the second NFC coupler and the second port region on the second surface of the housing, configured to propagate near-field electromagnetic energy emanated from the second NFC coupler through the second port region;
wherein the second port region is offset laterally from the second NFC coupler.

4. The system of claim 3, wherein the surface of the housing and the second surface of the housing are on opposite sides of the module, wherein the second NFC coupler is laterally displaced from the NFC coupler on the substrate.

5. The system of claim 1, wherein the field confiner is a dielectric block having a relative permittivity greater than 1.0.

6. The system of claim 1, wherein the field confiner is a negative index metamaterial.

7. The system of claim 1, further comprising a plurality of NFC couplers, coupled to a plurality of RF transmitters or receivers mounted on the substrate.

8. The system of claim 1, wherein the near-field electromagnetic energy emanated from the NFC coupler has a frequency in a range of 5-100 GHz.

9. The system of claim 1, wherein the field confiner has a conductive sidewall.

10. The system of claim 1, in which the field confiner fills a gap between the port region on the surface of the housing and the NFC coupler.

11. The system of claim 3, further comprising:
a backplane;
a plurality of modules attached to the backplane, wherein a module of the plurality modules has a first port region and a second port region, and an adjacent module of the plurality of modules has a first port region and a second port region; and
wherein the first port region of the module aligns with the second port region of the adjacent module.

12. The system of claim 1, wherein the module further comprises an artificial magnetic conductor (AMC) surface adjacent to the back side of the NFC coupler.

13. The system of claim 12, wherein the AMC surface comprises a first conductive layer and a second conductive layer separated by a dielectric layer, wherein the first conductive layer is an array of isolated conductive regions, and the second conductive layer is coupled to a ground reference for the RF transmitter.

14. The system of claim 12, wherein the AMC surface is in a second substrate that is separate from the substrate.

15. A method for transmitting a signal between modules in a system, the method comprising:
generating, by a radio frequency (RF) transmitter of a module, an RF electromagnetic field;
emanating, by a near field communication (NFC) coupler of the module, the RF electromagnetic field;
propagating the RF electromagnetic field, by a skewed field confiner, to a port region in a housing of the module having an opening whose cross section is:
parallel to the NFC coupler; and
laterally skewed from the NFC coupler.

16. The method of claim 15, further comprising:
receiving, by a second port region of a second module, the RF electromagnetic field, the second module adjacent to the module;
propagating the RF electromagnetic field received from the second port region of the second module, by a second skewed field confiner of the second module;
coupling the RF electromagnetic field to a second NFC coupler in the second module, wherein the second port region of the second module is laterally skewed from the second NFC coupler; and
providing the RF electromagnetic field to an RF receiver of the second module.

17. The method of claim 15, further comprising:
generating, by a second RF transmitter of the module, a second RF electromagnetic field;
emanating, by a second NFC coupler of the module, the second RF electromagnetic field; and
propagating, by a second field confiner, the second RF electromagnetic field, to a second port region, wherein the second port region is laterally skewed from the second NFC coupler.

18. The method of claim 15, further comprising reflecting a portion of the RF electromagnetic field, by an artificial magnetic conductor (AMC) surface proximate to the NFC coupler, wherein the RF electromagnetic field is not phase shifted during reflection.

19. The system of claim 1, further comprising a second module, comprising:
   a second substrate;
   a second housing surrounding the second substrate, the second housing having a second port region, the second port region aligned with the port region of the housing;
   a second NFC coupler on the second substrate, the second NFC coupler offset from the second port of the second module and from the NFC coupler; and
   a second field coupling confiner the second NFC coupler and the second port region.

20. A module comprising:
   a substrate;
   a first near field communication (NFC) coupler on a first surface of the substrate;
   a first field confiner coupled to the first NFC coupler;
   a second NFC coupler on a second surface of the substrate, the first NFC coupler laterally offset from the second NFC coupler; and
   a second field confiner coupled to the second NFC coupler.

* * * * *